July 23, 1935.   J. R. MUNN   2,008,767
COOKING UTENSIL
Filed Dec. 14, 1933

INVENTOR
John Randall Munn
BY
ATTORNEY

Patented July 23, 1935

2,008,767

UNITED STATES PATENT OFFICE 2,008,767

COOKING UTENSIL

John Randall Munn, Princeton, N. J., assignor to American Gas Accumulator Company, Elizabeth, N. J., a corporation of New Jersey Application December 14, 1933, Serial No. 702,367

3 Claims. (Cl. 53—5)

My invention relates to cooking utensils and has particular reference to broiling pans. Still more particularly, the invention relates to broiling pans for broiling articles of food such as meat and the like by the aid of stoves of the hot plate type which do not provide the open flame usually employed for broiling purposes.

The general object of the invention is to provide a new and improved broiling pan which will satisfactorily broil articles of food without the aid of an open flame.

The detailed nature of the invention and the manner in which the above general object and other more detailed objects are obtained may best be understood from a consideration of the ensuing description of a preferred form of broiling pan embodying the invention, illustrated in the accompanying drawing forming a part of this specification, in which Fig. 1 is a plan view of the pan;

Figure 1:
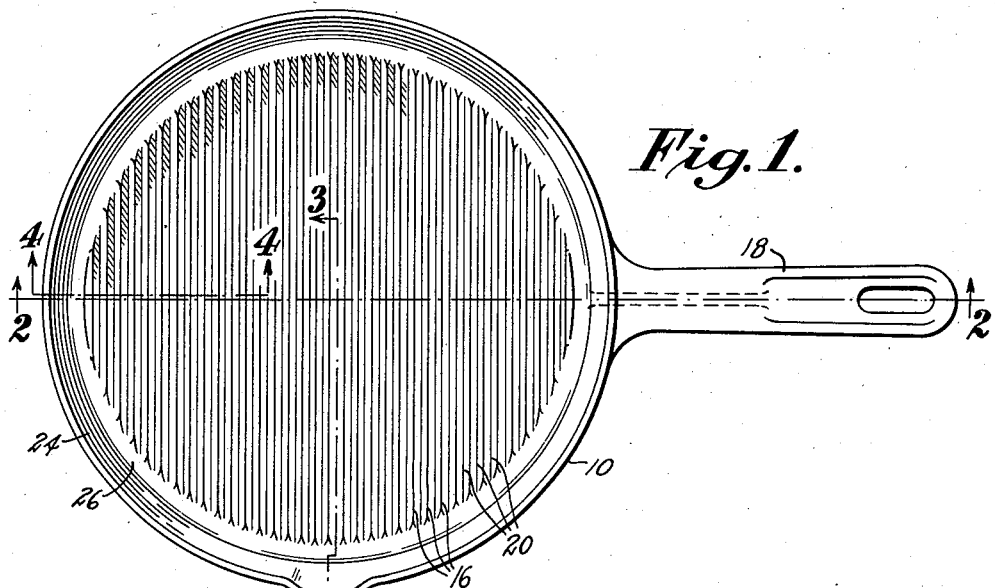
Figure 2:
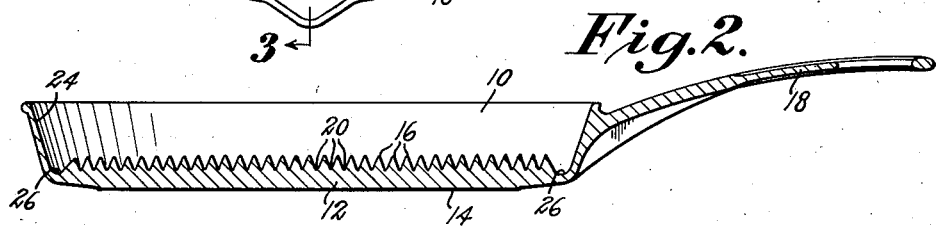
Fig. 2 is a sectional view taken on the line 2—2 of Fig. 1.
Figure 3:
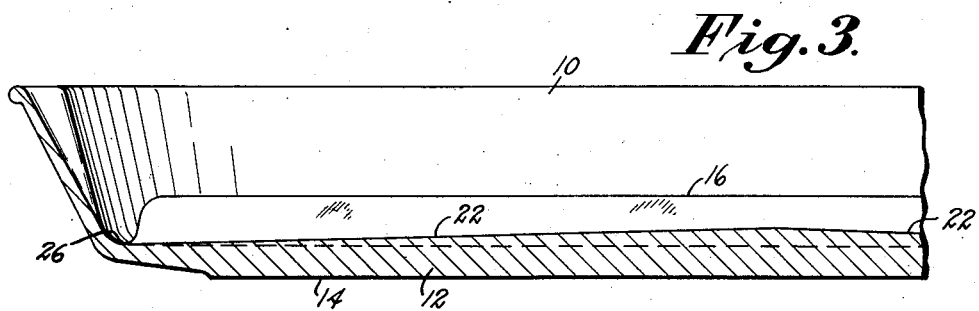
Fig. 3 is a sectional view on an enlarged scale of part of the pan, taken on the line 3—3 of Fig. 1.
Figure 4:
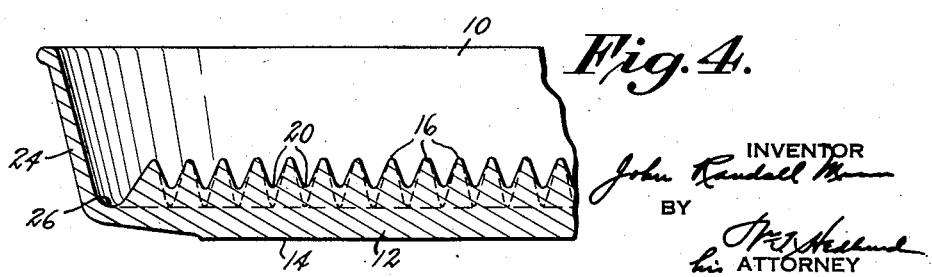
Fig. 4 is an enlarged sectional view taken on the line 4—4 of Fig. 1.

Referring now to the drawing, the pan designated generally at 10 is made of metal and is preferably cast. The material may be iron or aluminum. In the illustrated form the pan is circular and has substantially the proportions of the usual frying pan, being of relatively large diameter as compared with its depth. The bottom portion 12 of the pan is relatively thick, being considerably thicker than is usual practice for utensils of this kind, and in the case of a cast pan the lower surface 14 is machined to provide a smooth plane surface which preferably is unbroken over its entire area. The upper face of the bottom portion 12 is irregular and in its preferred form is serrated to provide a number of relatively narrow and closely spaced ridges 16, which advantageously extend transversely of the axis of handle 18. Ridges 16 are separated by intervening grooves 20, the bottoms of which are inclined as indicated at 22. Preferably the bottoms of the grooves are inclined downwardly from the center line of the pan toward the perimeter.

As appears more clearly from Fig. 1, the ridges and grooves formed by the serrated part of the bottom of the pan terminate short of the side wall 24 of the pan so as to provide adjacent thereto a circular trough 26.

The function of the construction just described to effect broiling is as follows:

The plane bottom surface 14 of comparatively large area is adapted to make good contact with a large area of a hot plate surface, and heat is transmitted by conduction through the heavy bottom 12 of the pan to the ridges 16 upon which the article to be broiled rests. In order to insure proper broiling and not frying of the article, the ridges are relatively closely spaced so as to prevent sagging of portions of the article between the places of support on the ridges into the intervening grooves. The grooves 20 are relatively deep as compared with their width and drippings can consequently fall clear of the article being broiled. The inclined bottoms of the grooves serve as drain channels for draining the drippings to the circular trough 26, and thus the drippings are carried away from beneath the article being broiled, so as to effectively prevent frying of the article or any portion thereof in its own drippings.

Since the broiling is accomplished by heat transmitted by conduction through the bottom of the pan, it is important to provide a large area of unbroken plane surface on the bottom of the pan for contact with the hot plate with which the pan is adapted to be used, and the heavy section of metal in the bottom of the pan minimizes the possibility of warping of the bottom surface so that portions thereof may not be in contact with the hot plate surface. In the illustrated form of pan, the plane bottom surface 14 is not of as large diameter as the body portion of the pan since the desired diameter of the pan may be somewhat larger than the usual maximum diameter for hot plates for cooking purposes, and it is desirable that the plane surface for contacting the hot plate be no longer in diameter than the hot plate, since if it extends beyond the hot plate there is the possibility of the pan resting on an adjacent surface at a higher level than that of the hot plate, and this of course would prevent proper contact between the bottom of the pan and the hot plate. Obviously, the finished plate bottom surface of the pan may be extended to the full diameter of the pan if desired, and it will also be evident that other arrangements of serrations providing ridges and intervening drain grooves may be employed.

The close parallel arrangement of ridges divided by uniform serrations I consider preferable, however, since this arrangement gives the most desirable uniform character of support for the article to be broiled so as to insure that no portions of the article sag below the ridges to a degree permitting such portions to lie in the grease or drippings produced by the cooking operation. By way of example, I consider it desirable for a pan having a diameter of approximately 10 inches at the trough 26 to have a solid bottom thickness of about ¼ inch with a total thickness between the bottom surface 14 and the top of the ridges 16 of about ⅝ inch, the ridges being spaced apart about ¼ inch and the intervening grooves 20 having a minimum depth of approximately ¼ inch and a maximum depth adjacent the trough 26 into which they discharge of approximately ⅜ inch.

What I claim is:

1. A circular metal broiling pan comprising a relatively thick bottom portion having a plane lower surface of relatively large area as compared with the total area of the pan, said lower surface constituting the lowermost portion of the pan and providing for absorption of heat by conduction from the flat top of a stove or the like and a serrated upper surface providing a plurality of relatively closely spaced parallel ridges and a plurality of intervening relatively deep and narrow grooves, said grooves and ridges terminating short of the side wall of the pan to provide a peripheral trough adjacent said side wall and the bottoms of the said grooves being inclined with respect to the plane of said lower surface to cause the grooves to drain into said peripheral trough.

2. A circular broiling pan of cast metal comprising a relatively thick bottom portion having a lower surface finished to provide an unbroken smooth plane surface of large area as compared with the total area of the bottom portion, whereby to provide maximum contact between said bottom portion and a hot plate surface, and a serrated upper surface providing a plurality of relatively closely spaced parallel ridges and intervening relatively deep and narrow grooves, said ridges and grooves extending across the bottom portion of the pan and terminating short of the side wall of the pan to provide a peripheral trough adjacent to the side wall, the bottom of the said grooves being inclined with respect to the plane of said lower surface from a diametral center line of the pan to the periphery thereof to provide for drainage from the grooves to said peripheral trough.

3. A metal broiling pan comprising a relatively thick bottom portion having a lower surface and an upper surface, said upper surface being irregular to provide a plurality of relatively closely spaced ridges, a plurality of intervening grooves having bottoms inclined with respect to the plane of the bottom of the pan to provide drainage from the grooves of drippings from an article supported on the ridges and a trough into which said grooves drain, said lower surface constituting the lowermost portion of the pan and the major portion of said lower surface being plane and adapted to contact the flat top of a stove or the like over a relatively large area whereby to absorb substantially by conduction the heat transmitted to the pan from said top.

JOHN RANDALL MUNN.